June 24, 1941.  E. KINSELLA  2,246,594
SUPPLYING LIQUIDS AT CONSTANT RATES
Filed April 14, 1938   3 Sheets-Sheet 1

Inventor:
E. Kinsella

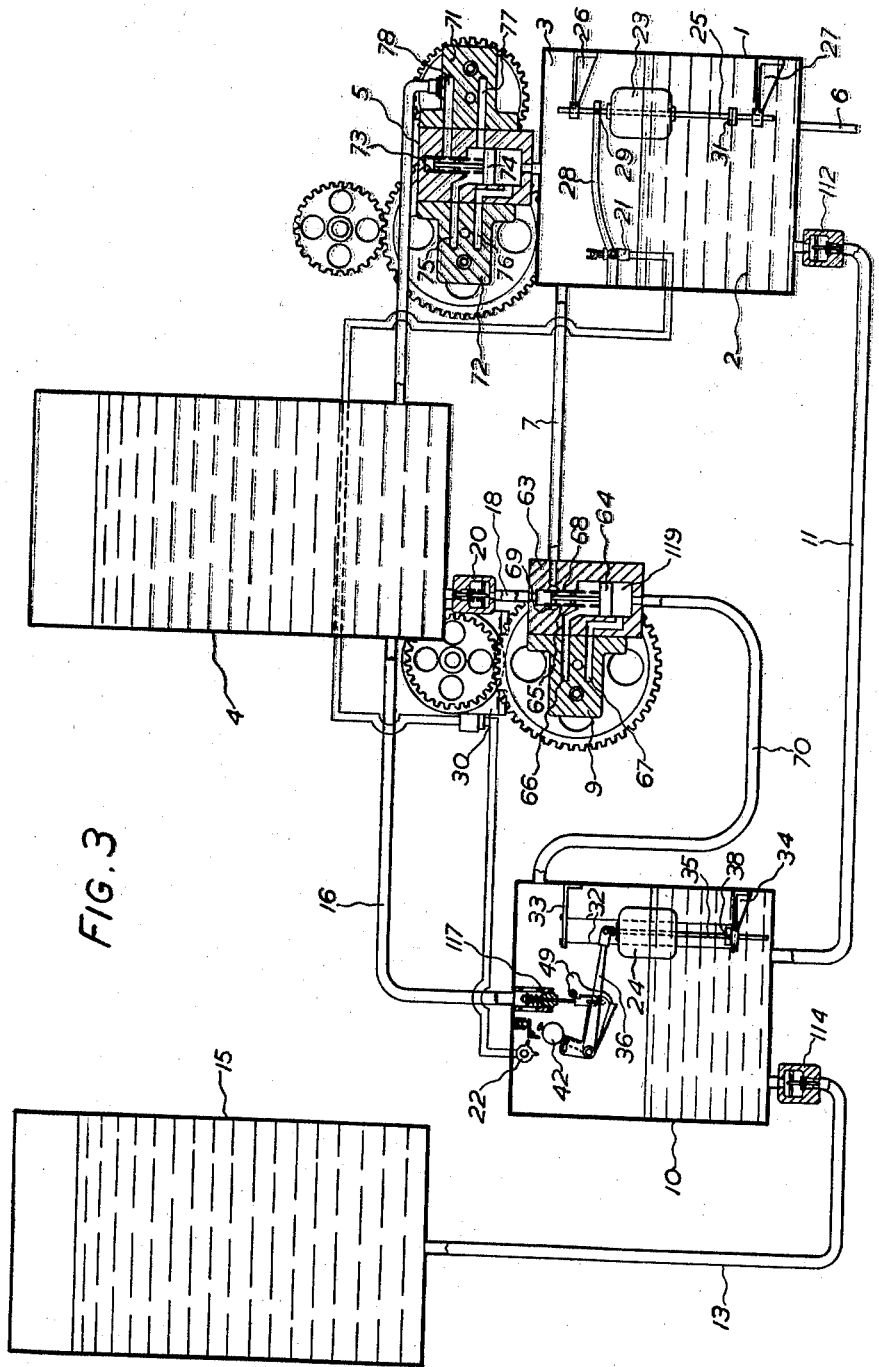

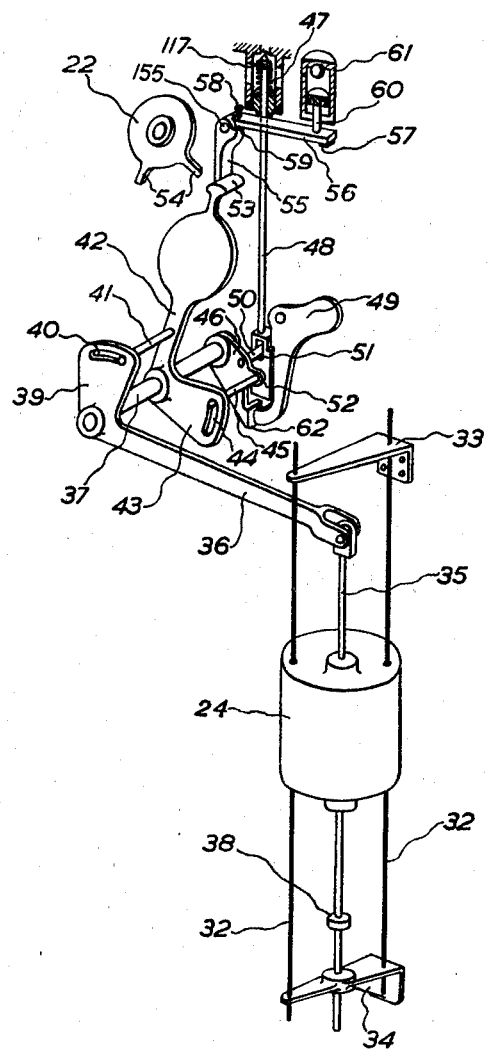

Patented June 24, 1941

2,246,594

UNITED STATES PATENT OFFICE 2,246,594

SUPPLYING LIQUIDS AT CONSTANT RATES

Edward Kinsella, Spondon, near Derby, England, assignor to Celanese Corporation of America, a corporation of Delaware Application April 14, 1938, Serial No. 201,987
In Great Britain April 29, 1937

11 Claims. (Cl. 103—11)

This invention relates to a method of and means for continuously supplying a liquid at a constant rate.

It is sometimes desired to supply a liquid continuously at a constant rate. Thus, for example, in the manufacture of artificial filaments and like products by extruding a coagulable liquid into a coagulating medium, it is of great importance with a view to obtaining uniform products to supply the liquid to the extrusion orifice at a constant rate. In the case of liquids such as viscose and cellulose derivative solutions, the method which is invariably adopted is to supply the liquid by means of a continuous delivery measuring pump. Some liquids, however, e. g. rubber latex and like dispersions, cannot be passed through a measuring pump without danger of coagulation, corrosion of the pump or other disadvantage. Much ingenuity has hitherto been expended in attempting to solve the problem of maintaining a continuous supply of such liquids at a constant rate but no simple solution of this problem has hitherto been available. The present invention affords such a solution.

According to the invention, the liquid which it is desired to supply is continuously displaced at a constant rate from a closed container by means of a second liquid supplied at a constant rate, e. g. by a measuring pump, the continuously of supply from the container being maintained by replacing the quantity of the first liquid already displaced, by introducing a further quantity of such first liquid at a higher rate than that at which it is displaced and simultaneously and at the same higher rate removing an equal quantity of the second liquid.

The feeding of the container with fresh quantities of the first liquid can be effected by displacing this liquid by suitable means from an auxiliary closed container. Conveniently, the required quantity of the first liquid is displaced from the auxiliary container by means of a liquid pumped in at the same rate as the second liquid is withdrawn from the main container, in which case the quantity of the second liquid removed from the main container may be transferred to the auxiliary container to displace an equal quantity of the first liquid. This can be done for instance by providing an auxiliary constant delivery pump, e. g. a gear pump of higher capacity than the measuring pump, connected on its inlet side to the upper part of the main container (assuming that the second liquid is lighter than the first) and on its outlet side to the upper part of the auxiliary container.

By feeding the first liquid to the main container at a higher rate than that at which it is displaced therefrom by the operation of the measuring pump, time is available between successive feeding operations to replenish the supply of the first liquid in the auxiliary container. It is of advantage, with this object in view, to make the delivery rate of the auxiliary pump several times as great as the delivery rate of the measuring pump.

The invention will now be described in greater detail with reference to the accompanying drawings, in which Fig. 1 represents an arrangement for continuously supplying rubber latex to, and causing it to be extruded through, a die (the so-called spinning jet) into a coagulating bath to form rubber threads;

Fig. 3 represents a similar arrangement to that of Fig. 2 but adapted for automatic operation; and Fig. 4 is a perspective view of the control mechanism in the auxiliary container shown in Fig. 3.

Figure 1:
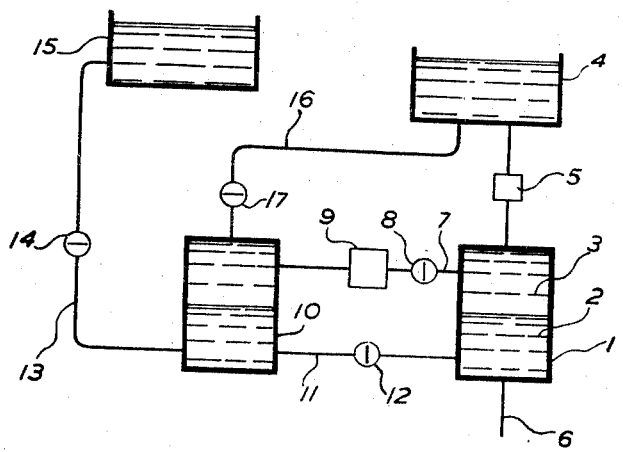

Referring to Fig. 1, the closed container 1 is partly filled with latex 2. The space above the latex is filled with a body of oil 3 lighter than, and immiscible with, the latex. Oil is continuously supplied from a tank 4 by means of a measuring pump 5 to the container 1 above the level of the latex and forces latex at the same rate through the outlet 6. The oil space 3 in the container 1 is also connected through a pipe 7 in which is a valve 8 and a second pump 9 of higher capacity than the pump 5 to the oil space in an auxiliary container 10 which is also filled with a lower body of latex and an upper body of oil. A further pipe 11, in which is a valve 12, connects the latex spaces of the containers 1 and 10.

When the latex in the container 1 has sunk to a predetermined level, the valves 8 and 12, which in the drawings are shown closed, are opened and the pump 9 is started. This withdraws oil from the container 1, and pumps it into the container 10 with the result that simultaneously an equal quantity of latex is displaced from 10 and forced through the pipe 11 into the container 1. When the latex in 1 has risen to the desired level, the pump 9 is stopped and the valves 8 and 12 are closed. The container 10 is then refilled through a pipe 13 by opening a valve 14 to permit latex to flow by gravity from a supply tank 15, displaced oil returning to the tank 4 by a pipe 16, a valve 17 in which must also be opened. While the container 10 is being used to feed the container 1, the valves 14 and 17 must be kept closed as shown in the figure.

The pressure in the container 1 may be considerably above atmospheric pressure. It is, however, convenient to feed the auxiliary container 10 from the tank 15 under a considerably lower pressure, e. g. by gravity. It is therefore of advantage to provide means for building up the pressure in the container 10 so that the pressures in the two containers are nearly the same before the containers are connected for transfer of latex from the one to the other to be effected by means of the pump 9.

Figure 2:
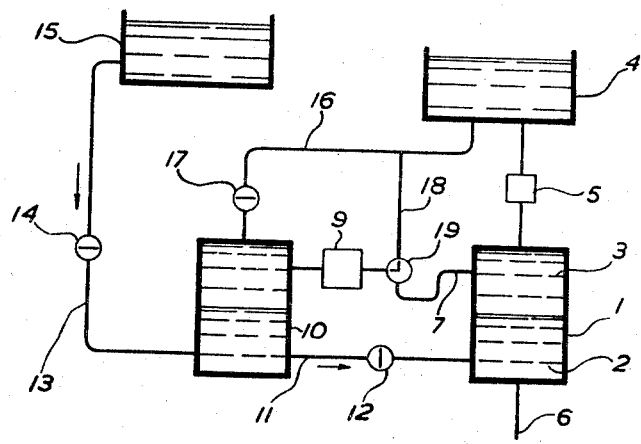
Fig. 2 represents a similar arrangement adapted for high pressure displacement of the latex to the die.

Fig. 2 shows diagrammatically an arrangement having such means in the form of a valve 19, taking the place of the valve 8 of Fig. 1 and adapted to connect the inlet of the pump 9 either to the pipe 7 or to the tank 4 through a pipe 18. Using this arrangement, when it is desired to feed the container 1, the first operation is to connect the inlet of the pump 9 through a pipe 18 to the oil tank 4 as shown in Fig. 2. The pump 9 then pumps oil from the tank 4 into the container 10 until the pressure in that container is substantially equal to that in the container 1. At this point the valve 19 is operated to cut off the inlet of the pump 9 from the oil reservoir 4 and to connect the pump inlet through the pipe 7 to the container 1. The transfer of oil from the container 1 to the container 10 and latex from the container 10 to the container 1 then proceeds as described with reference to Fig. 1.

The fully automatic apparatus shown in Fig. 3 has a general arrangement similar to that of Fig. 2, but the valves 12 and 14 are replaced by non-return valves 112 and 114, valve 17 is replaced by a spring-closed needle valve 117, the two-way valve 19 takes the form of a balance valve 119 and an additional spring loaded non-return valve 20 is provided in the pipe 18 to allow oil to be pumped from the oil tank 4 into the container 10 until the pressure therein is nearly equal to that in the container 1. In addition float gear is provided in both containers 1, 10, that in container 10 operating valve 117 and co-operating with that in container 1 to control the working of pump 9 which is electrically driven.

The arrangement is such that feeding of container 1 from container 10 can only take place when the latex level in the former is low and that in the latter is high. In series in the circuit supplying the electric power for driving the pump 9 are two toggle switches 21, 22. The switch 21 is closed by the fall and opened by the rise of a float 23 in container 1 as the latex level in that container rises or falls beyond predetermined levels. The other switch 22 is closed by the rise and opened by the fall of a similar float 24 in container 10. The float 24 also opens valve 117 in falling and closes this valve in rising.

The float gear in container 1 comprises a vertical spindle 25 slidably mounted in upper and lower brackets 26, 27 extending from the sides of the container, the float 23 sliding axially on said spindle. The switch 21 operated by said float gear is operated by an arm 28 which is substantially horizontal in the off position. The free end of the arm lies above the float 23 and is pivoted to the spindle 25 at 29. The float is designed to rise and fall with the level of latex in the container. When it has fallen to a predetermined position, carrying the spindle with it, the arm 28 closes the switch and starts the motor 30 of pump 9—provided that the second switch 22 is not open, as would be the case were the level of latex in container 10 too low. As the float 23 rises again with the replenishment of the latex in container 1, the arm 28 is lifted until it opens the switch 21. A collar 31 limits the downward movement of the float 23.

The float 24 in container 10 slides along a pair of vertical guide wires 32 supported by brackets 33, 34, and is connected to a vertical spindle 35 guided at the bottom by the bracket 34 and connected at the top to an arm 36 pivoted on a dead spindle 37. A collar 38 limits the downward movement of the float 24. The arm 36 is part of a bell-crank lever whose other arm 39 extends upwards and has an arcuate slot 40 coaxial with the shaft 37 in which rides a pin 41 on an upwardly extending weighted arm 42 of a second bell-crank lever also freely mounted on the shaft 37. The other arm 43 of the bell-crank lever has an arcuate slot 44 coaxial with the shaft 37 in which rides a pin 45 on a third lever 46 also freely mounted on the shaft. The valve 117 is forced into closed position by a spring 47, but can be held open by the engagement of its downwardly depending valve rod 48 by a latch 49 adapted to be operated by the lever 46. A pin 50 projecting from the lever 46 engages freely a vertical slot 51 in a block 52 on the end of the valve rod 48 and enables the valve 117 to be opened by clockwise movement of the lever 46.

The second switch 22 is operated by a lug 53 at the upper end of the weighted arm 42, the swinging of the arm about the shaft 37 causing the lug to strike one or other of two radial projections 54 on the switch.

Hinged about a fixed pin 155 so as to swing in a plane parallel to that of the weighted lever 42 is a member 55 depending downwards into the path of the lug 53, and another member 56 normally maintained in a substantially horizontal position by means of a support 57. A set screw 58 in the member 56 rests on a shoulder 59 of the member 55. The member 56 engages the vertical piston rod 60 of a dash-pot 61. When the weighted arm 42 swings anti-clockwise to close the switch 22 by engaging the left-hand projection 54, the member 55 is moved freely by the lug 53 without moving the member 56, but when the arm 42 moves clockwise, after opening the switch by engagement of the right-hand projection 54, its further movement is retarded by the member 55 which can only move out of the path of the lug 53 by moving the member 56 against the resistance provided by the dash-pot 61. This delay-action device gives time for the pump motor 30 to stop before the valve 117 is opened by the lever 46 for refilling of the container 10 by gravity from the tank 15 to commence.

When the float 24 in container 10 is at the bottom of its stroke the switch 22 is open, the arm 42 is inclined to the right and the valve rod 48 is held down by the latch 49 so that the valve 117 is open. As the latex level rises in the container, the float 24 also rises and moves the lever 36 which in turn moves the arm 42 firstly into the vertical position and then slightly more till the arm then falls to the left, a movement that is permitted by the slot 40 in the lever 39. The slot 44 allows the lever 42 to acquire momentum before the lower end of the slot 44 in the arm 43 engages the pin 45. The lever 46 has a tongue 62 that engages the latch 49 and allows the spring 47 to close the valve 117. During this movement, the lug 53 closes the switch 22 so that the motor of pump 9 will start as soon as the switch 21 is closed.

When the float 24 in container 10 falls to a predetermined point, it causes the lever 42 to move clockwise, the slot 40 permitting the lever to fall when it passes the vertical. The lever opens the switch 22, but further movement of this lever is then retarded by the dash-pot 61 because of the engagement of the lug 53 with the member 55. After the lug clears the end of the member 55, the lever 42 falls freely and through the pin 50 on the lever 46 forces the block 52 on the end of the valve rod 48 downwards, so opening the valve 117. The block 52 is re-engaged by the latch 49.

The balance valve 119 comprises a casing 63 in which operates a piston 64 having a hollow stem 65 so that the upper side of the piston may communicate with the pipe 18. A passage 66 leads from the upper side of the piston to the inlet of the pump 9, and a return passage 67 leads from the outlet of the pump to the under side of the piston. When the piston 64 is raised sufficiently, a port 68 in the stem communicates with an annular recess 69 connected to the pipe 7.

With the pump 9 set in operation by the closing of both switches 21, 22, oil is drawn by the pump from the tank 4 through the pipe 18 into the tank 10, the valve 117 having been closed by the operation of the float 24 and the port 68 not being in communication with the pipe 7. As the pressure in container 10 is being built up to equal that in container 1, the piston 64 rises until the port 68 registers with the recess 69, the non-return valve 20 closes, and the pump 9 draws oil from the container 1 by the pipe 7 and the pipe 70 into the container 10, and by displacement forces latex from the container 10 through the pipe 11 and non-return valve 12 into the container 1, the whole of the liquid being at the pressure maintained in the container 1 by the pump 5. The transfer of liquids continues until the float 23 cuts off the motor 30 which drives pump 9. The valve 12 closes, and the piston 64 falls. The float 24 opens the valve 117 and latex flows into the container 10 by the pipe 13, displaced oil passing by the valve 117 to the tank 4.

The pump 5 for ensuring a constant supply of oil from the tank 4 to the oil space in the container 1 is of the dual type, working with a balance valve to ensure uniform delivery even under varying pressure conditions, which is particularly useful where the latex is being supplied to an extrusion orifice that may become choked. The first pump 71 has a greater delivery rate than the second 72. The balance valve 73 is controlled by a piston subjected on opposite sides to the pressure on the inlet and outlet sides 75, 76 respectively of the pump 72. The valve 73 controls a bye-pass from the outlet side 77 to the inlet side 78 of the pump 71 in such a way that a variation in the pressure on the outlet side 76 of the pump 72 causes a variation in the effective area of the bye-pass, and so restores the original pressure relationship between the two sides of the pump 72. When such an arrangement of two pumps and a balance valve is introduced in place of the single measuring pump between the tank 4 and the container 1, any variation in pressure at the extrusion point will be transmitted through the container 1 to the oil on the outlet side of the measuring pump and will produce a corresponding variation in pressure on the inlet side of the measuring pump, so maintaining the rate at which oil is supplied to the container 1 and therefore the rate at which latex is displaced therefrom substantially constant.

The invention has been described with particular reference to supplying rubber latex to an extrusion point in the manufacture of rubber filaments. The process and apparatus of the invention are, however, capable of many other applications in pumping liquids which for one reason or another it is undesirable to pass directly through a measuring pump yet which are required to be supplied at a constant rate. It is not of course essential to use oil as the displacing liquid. Any liquid immiscible with the liquid which is to be displaced and which is otherwise suitable can be used. A simple and obvious modification (i. e. a general inversion of pipe connections) of the apparatus as described will enable liquids heavier than the liquid to be displaced to be used. The use of a septum or piston between the two liquids in the container 1 is not excluded and when such an arrangement is used it is not necessary that the two liquids should be immiscible.

Having described my invention, what I desire to secure by Letters Patent is:

1. Method of supplying liquids by displacement, which comprises continuously displacing a liquid from a body of liquid of constant volume at a constant rate by means of a second liquid immiscible with the first and supplied to said body of liquid at a constant rate, and, in order to maintain the continuity of supply of the first liquid from said body of liquid, replacing the quantity of the first liquid already displaced by intermittently introducing a further quantity of said first liquid at a higher rate than that at which it is being displaced and simultaneously and at the same higher rate removing an equal quantity of the second liquid.

2. Method of supplying liquids by displacement, which comprises continuously displacing a liquid from a body of liquid of constant volume at a constant rate by means of a second liquid immiscible with the first and supplied to said body of liquid at a constant rate, and, in order to maintain the continuity of supply of the first liquid from said body of liquid, replacing the quantity of the first liquid already displaced by intermittently introducing from an auxiliary body of liquid of constant volume a further quantity of said first liquid at a higher rate than that at which it is being displaced and simultaneously and at the same higher rate transferring an equal quantity from said body of liquid to said auxiliary body of liquid.

3. Method of supplying liquids by displacement, which comprises continuously displacing a liquid from a main body of liquid of constant volume at a constant rate by means of a second liquid immiscible with the first and supplied to said main body at a constant rate, and, in order to maintain the continuity of supply of the first liquid from said main body, replacing from an auxiliary body of liquid of constant volume the quantity of the first liquid already displaced by intermittently building up the pressure in said auxiliary body to substantial equality with the pressure in said main body and then introducing a further quantity of the first liquid from said auxiliary body to said main body at a higher rate than that at which it is being displaced from said main body and simultaneously and at the same time transferring an equal quantity of the second liquid from said main body to said auxiliary body.

4. Method of supplying liquids by displacement, which comprises continuously displacing a liquid from a main body of liquid of constant volume at a constant rate by means of a second liquid immiscible with the first and supplied to the main body at a constant rate, and, in order to maintain the continuity of supply of the first liquid from said main body, replacing from an auxiliary body of liquid of constant volume the quantity of the first liquid already displaced by intermittently building up the pressure in said auxiliary body to substantial equality with the pressure in the main body by pumping liquid into said auxiliary body and then introducing a further quantity of the first liquid from said auxiliary body to said main body at a higher rate than that at which it is being displaced from said main body and simultaneously and at the same time transferring an equal quantity of the second liqiud from said main body to said auxiliary body, the change in level of the first liquid in said main body being utilized to control said pumping operation.

5. Apparatus for supplying liquids by displacement, comprising a closed container for containing the liquid to be supplied, an outlet from said container, means for supplying a second liquid immiscible with the first liquid to said container at a constant rate so as to displace the first liquid at the same constant rate, means for intermittently introducing a further quantity of the first liquid into said container at a higher rate than that at which it is displaced, and means for removing an equal quantity of the second liquid at the same higher rate.

6. Apparatus for supplying liquids by displacement, comprising a closed main container for containing the liquid to be supplied, an outlet from said main container, means for supplying a second liquid immiscible with the first liquid to said main container at a constant rate so as to displace the first liquid at the same constant rate, an auxiliary closed container, means for intermittently introducing a further quantity of the first liquid from said auxiliary container into said main container at a higher rate than that at which it is displaced, and means for transferring an equal quantity of the second liquid at the same higher rate from said main container to said auxiliary container.

7. Apparatus for supplying liquids by displacement, comprising a closed main container for containing the liquid to be supplied, an outlet from said main container, means for supplying a second liquid immiscible with the first liquid at a constant rate so as to displace the first liquid at the same constant rate, an auxiliary closed container, a valve connection between said main and auxiliary containers, means for putting said auxiliary container under pressure, means for intermittently introducing a further quantity of the first liquid into said main container at a higher rate than that at which it is displaced, and means for transferring an equal quantity of the second liquid at the same higher rate from said main container to said auxiliary container, said valve connections being such that said containers are only put into communication with each other when the pressures therein are substantially equal.

8. Apparatus for supplying liquids by displacement, comprising a closed main container for containing the liquid to be supplied, an outlet from said main container, means for supplying a second liquid immiscible with the first liquid at a constant rate so as to displace the first liquid at the same constant rate, an auxiliary closed container, a pump for applying pressure to said auxiliary container, a valve connecting said pump to a supply of the second liquid and pressure operated means controlling said valve so as to cut off said pump from said supply of second liquid and to connect said pump to the main container when said pump has raised the pressure in said auxiliary container to substantial equality with that in said main container, so as to introduce intermittently a further quantity of the first liquid into said main container at a higher rate than that at which it is displaced, and means for transferring an equal quantity of the second liquid at the same higher rate from said main container to said auxiliary container.

9. Apparatus according to claim 8, comprising a float in the main container, a motor for driving the pump, and a switch in the motor circuit controlled by the float.

10. Apparatus according to claim 8, comprising a float in the main container, a float in the auxiliary container, a motor for driving the pump, and two switches in series in the motor circuit, one switch being controlled by each of said floats.

11. Apparatus according to claim 8, comprising a float in the main container, a float in the auxiliary container, a motor for driving the pump, two switches in series in the motor circuit, one switch being controlled by each of said floats, a valve for the escape of the second liquid from the auxiliary container, said valve being controlled by the float in said auxiliary container, delay action means to prevent opening of said valve until said motor has stopped and means for supplying a further quantity of the first liquid to said auxiliary container by the displacement of the second liquid through said valve.

EDWARD KINSELLA.